(12) United States Patent
Eberhard et al.

(10) Patent No.: US 6,770,885 B2
(45) Date of Patent: Aug. 3, 2004

(54) SYSTEMS AND METHODS FOR DETECTING IONIZING RADIATION WITH AN IMAGING SYSTEM

(75) Inventors: Jeffrey Wayne Eberhard, Albany, NY (US); Herbert Stanley Cole, Burnt Hills, NY (US); Robert Forrest Kwasnick, Palo Alto, CA (US); Theresa Ann Sitnik-Nieters, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 09/682,389

(22) Filed: Aug. 29, 2001

(65) Prior Publication Data

US 2003/0042424 A1 Mar. 6, 2003

(51) Int. Cl.⁷ .................................................. G01T 1/20
(52) U.S. Cl. ............................. 250/370.11; 250/370.01
(58) Field of Search ....................... 250/370.11, 370.01, 250/208.1, 361 R (56) References Cited

U.S. PATENT DOCUMENTS

| | | | |
|---|---|---|---|
| 4,415,810 A | 11/1983 | Brown, Sr. | |
| 5,179,284 A | * 1/1993 | Kingsley et al. | 250/370.11 |
| 5,187,369 A | * 2/1993 | Kingsley et al. | 250/370.11 |
| 5,220,170 A | * 6/1993 | Cox et al. | 250/370.09 |
| 5,463,225 A | * 10/1995 | Kwasnick et al. | 250/370.11 |
| 5,585,280 A | 12/1996 | Kwasnick et al. | |
| 5,641,984 A | 6/1997 | Aftergut et al. | |
| 5,707,880 A | 1/1998 | Aftergut et al. | |
| 6,146,489 A | 11/2000 | Wirth | |
| 6,278,118 B1 | * 8/2001 | Homme et al. | 250/370.11 |
| 6,348,693 B1 | * 2/2002 | Weisfield et al. | 250/370.11 |

FOREIGN PATENT DOCUMENTS

| | | |
|---|---|---|
| EP | 0129682 A | 1/1985 |
| WO | 0010194 A | 2/2000 |
| WO | 0151952 A | 7/2001 |

OTHER PUBLICATIONS

PCT International Search Report, Mar. 4, 2004.

* cited by examiner

*Primary Examiner*—Constantine Hannaher
*Assistant Examiner*—Timothy J. Moran
(74) *Attorney, Agent, or Firm*—Penny A. Clarke; Patrick K. Patnode (57) ABSTRACT

A radiation imaging system comprising a scintillator, an imager array, and a lamination layer. Lamination layer bonds and optically couples scintillator to imager array. Lamination layer is comprised of a lamination material that is substantially free from void spaces. Radiation imaging system fabrication comprises the steps of disposing lamination layer between a light imager and a scintillator to form a subassembly. Light imager comprises imager array, an imaging plate surface and a plurality of contact pads. Additional steps include subjecting subassembly to a vacuum; heating subassembly to a bonding temperature, exerting a bonding force on subassembly, maintaining the vacuum, the bonding temperature and the bonding force until light imager is bonded to the scintillator and the lamination layer is comprised of lamination material that is substantially free from void spaces.

17 Claims, 5 Drawing Sheets

Alternate Lamination Materials

| Lamination material<br>Column 1 | Solvent<br>Column 2 | Solvent Drive Off Temp/Time<br>Column 3 | Bonding Temp/Time<br>Column 4 | Etch Methods<br>Column 5 | Comment<br>Column 6 |
|---|---|---|---|---|---|
| Benzocyclobutene (BCB) | mesitylene | ~150° C / ~30' | ~200 - 210° C / 60' | CF4/O2 plasma, excimer laser | Thermoset. TCE ~50 ppm/C |
| Ultem® Benzoflex S-552 | anisole | ~150° C / ~30' | ~200 - 220° C / 60' | O2 plasma, excimer laser | Thermoplastic. TCE ~50 ppm/C |
| Photodefinable BCB | mesitylene | ~150° C / ~30' | ~200 - 210° C / 60' | Expose to actinic radiation, then wet etch after solvent drive off | Thermoset. |
| Epoxies with latent heat catalysts | ketones | not required | ~150-200° C / 60' | O2 plasma, excimer laser | Thermoset. TCE ~50 ppm/C |
| Polyesters | ketones anisole | ~150° C / ~30' | ~150° C / 60' | O2 plasma, excimer laser | thermoplastic |
| Acrylics | toluene mesitylene | ~150° C / ~30' | ~200 - 210° C / 60' | O2 plasma, excimer laser | thermoplastic |

SYSTEMS AND METHODS FOR DETECTING IONIZING RADIATION WITH AN IMAGING SYSTEM

FEDERAL RESEARCH STATEMENT

The United States Government may have certain rights in this invention pursuant to contract number 70NANB5H1148 awarded by the United States Department of National Institute of Standards and Technology.

BACKGROUND OF INVENTION

This invention relates generally to ionizing radiation imaging systems and, more particularly, to systems and methods for coupling a scintillator to a light imager.

In one common imaging system configuration, an X-ray source projects an X-ray beam that passes through the object being imaged, such as an aircraft engine component. The beam, after being attenuated by the object, impinges upon a detector having an array of detector elements. The intensity of the radiation beam received at the detector is dependent upon the attenuation of the X-ray beam by the object. Each detector element of the array produces a separate electrical signal that is representative of the beam attenuation at the detector location. The attenuation measurements from all the detectors are acquired separately to produce an image. Multiple images may be taken of the same object, for example, by a series of rotations, and the set of images processed to form a cross-sectional image of the X-ray attenuation of the object.

The radiation imaging system commonly comprises a light imager (e.g., a photosensor array) coupled to a scintillator. The photosensor array comprises a plurality of pixels, each having a photosensitive element, such as a photodiode, and pixels are configured into a matrix of rows and several columns, e.g., about one thousand rows and columns. The scintillator includes scintillation material positioned over the imager array. As described below, the scintillator may be integral with the imager array, for use in detecting low energy (radiation less than about 100 keV), or a separate plate located over the imager array when the device is used for detection of high energy radiation (radiation above about 100 keV). Contact pads are coupled to or formed on the imager array adjacent the periphery of the imager array and are associated with the respective rows and columns in the imager array. Particularly, the contact pads facilitate accessing information from each row and column of the photosensing element array by enabling electrical contact to external circuitry.

The above-described system sometimes is referred to as a computed tomography (CT) system. Although the present invention is sometimes described in the context of CT systems, the present invention is not limited to use in connection with CT systems and can be utilized with other radiation based imaging systems, such as radiographic X-ray systems.

During scanning, X-rays are emitted from the X-ray source in the direction of the detector, and each X-ray, which interacts with the scintillator, is converted into visible photons in accordance with the scintillator gain. For example, a scintillator having a gain of 1000 converts each X-ray from the X-ray source, on average, into 1000 photons. These photons are detected by photosensors that develop an electrical signal (e.g., charge accumulation on a photodiode) corresponding to the detected photons. This accumulated electrical signal on photosensors in the array is accessed via the contact pads and used by readout electronics to provide an estimate of the location of the ray event. Further digital processing is used to integrate the signal from all elements of the photosensor array, and from multiple images if more than one scan is taken, and to form the acquired image.

For low energy radiation, a scintillator deposited directly on the light imager may be used. Due to the practical thickness limitations of deposition, on the order of 1 mm, for high energy radiation (i.e., radiation above about 100 keV), the scintillator typically is a separate plate coupled to the imaging plate so that a surface of the scintillating plate is adjacent the imaging plate.

In small ionizing radiation imagers, utilizing a separate scintillator plate generally provides satisfactory results. However, use of a separate scintillator plate may result in degradation of image quality in the larger two-dimensional, or area, ionizing radiation imagers. For example, directly coupling a large, e.g., greater than 100-$cm^2$ scintillator to a large, e.g., greater than 100-$cm^2$ scintillator, a light imager suffers from response variation due to a varying air gap between the scintillator and the light imager. In addition, imaging systems utilizing a scintillator coupled to a light imager may be susceptible to oversaturation. For example, if an X-ray source emits approximately 300,000 rays to generate an image, the scintillator produces approximately 300,000,000 photons. This photon level may exceed the capacity of the light imager system circuitry depending on the read time and charge capacity of the photosensing element (which in turn depends on the common voltage bias and area of each element). A typical common bias is about 10 volts (V) and a typical element size is about 0.01 to 1.0 $mm^2$. One way to avoid oversaturation is to perform multiple readouts. Performing multiple readouts, however, may result in excessively long total readout time for the part being imaged and increases noise for a single image. Until now, to prevent oversaturation, either the X-ray flux or the number of photons generated in the scintillator for each incident ray is reduced. Reducing the flux, however, degrades the system signal-to-noise ratio, which is undesirable.

It would be desirable to provide improved optical quality in high energy imaging systems with large imagers. The optical quality can be assessed using two quantitative measurements. The first quantitative measurement is the modulation transfer function (MTF), which represents a measure of the light spread. The second quantitative measurement is the detector quantum efficiency, which includes both the MTF and the noise terms; therefore, the detector quantum efficiency is a reflection of signal-to-noise ratio of the image detectability. It also would be desirable to reduce the likelihood of system oversaturation without significantly reducing signal-to-noise ratio or increasing readout time. It further would be desirable to provide a simple method for fabricating such an improved detector.

SUMMARY OF INVENTION

A radiation imaging system is provided comprising a scintillator, an imager array, and a lamination layer. The lamination layer bonds and optically couples the scintillator to the imager array. The lamination layer is comprised of a lamination material that is substantially free from void spaces.

A method for fabricating a radiation imaging system is provided comprising the steps of disposing a lamination layer between a light imager and a scintillator to form a subassembly. The light imager comprises an imager array, an imaging plate surface and a plurality of contact pads. Additional steps include subjecting the subassembly to a vacuum; heating the subassembly to a bonding temperature, exerting a bonding force on the subassembly, maintaining the vacuum, the bonding temperature and the bonding force until the light imager is bonded to the scintillator and the lamination layer is comprised of a lamination material that is substantially free from void spaces.

DETAILED DESCRIPTION

Figure 1:
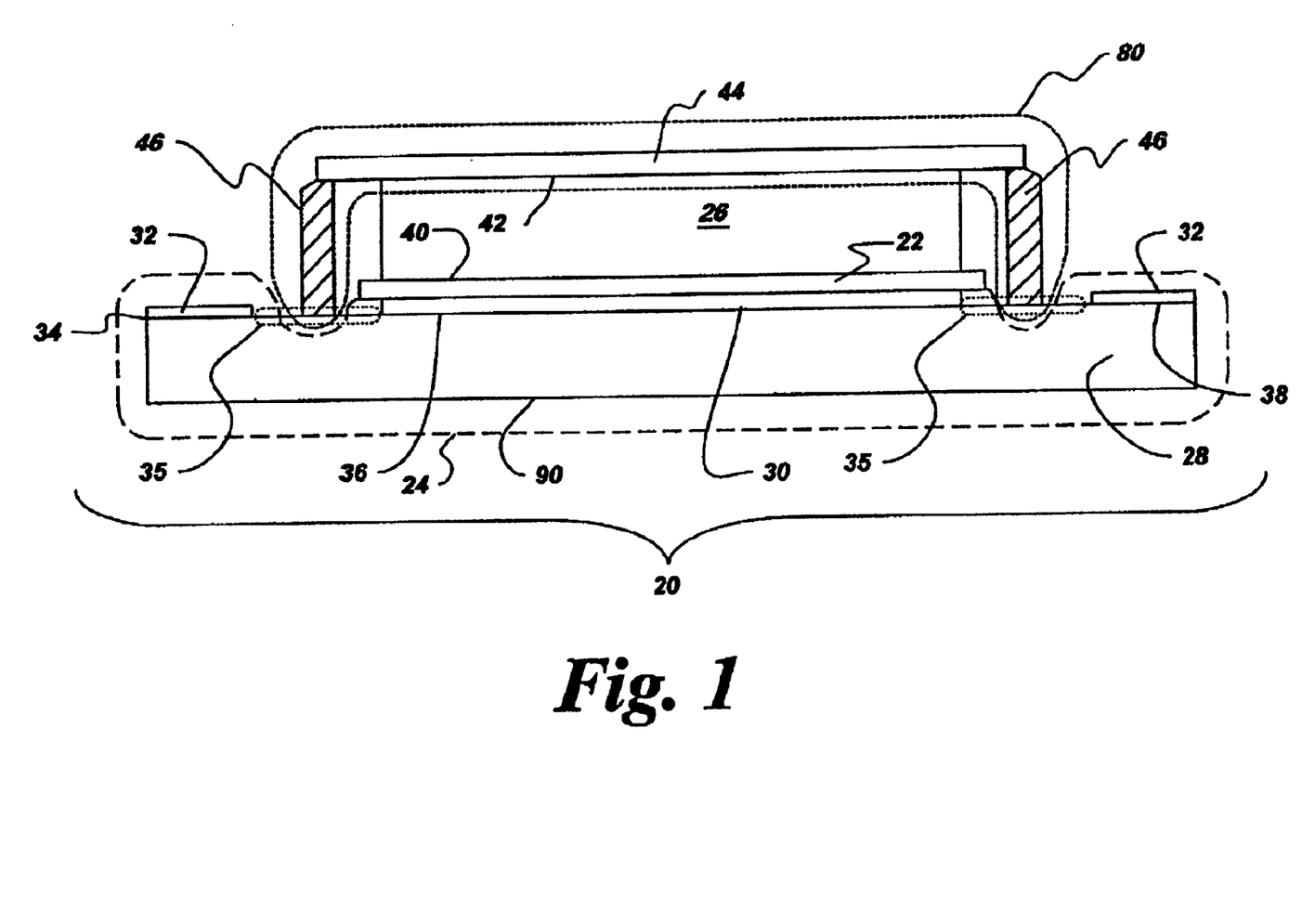
FIG. 1 is a side view of a radiation imaging system in accordance with one embodiment of the present invention.

A radiation imaging system 20 of FIG. 1 comprises a scintillator 26 of FIG. 1, an imager array 30 of FIG. 1, and a lamination layer 22 of FIG. 1. The lamination layer 22 bonds and optically couples scintillator 26 to imager array 30. The lamination layer 22 comprises a lamination material that is substantially free from void spaces.

A light imager 24 of FIG. 1 includes an imager substrate 28, an imaging plate surface 34 of FIG. 1, imager array 30 and a plurality of contact pads 32 of FIG. 1 (also referred to as fingers, by way of example and not limitation, only two contact pads 32 are shown in FIG. 1). Contact pads 32 are formed on a periphery 38 of imaging plate surface 34 (the electrical connection of contact pads 32 to the rows and columns of the photosensors of imager array 30 is not shown). Imager array 30 is formed on a central portion 36 of FIG. 1 of imaging plate surface 34 and includes a matrix of photosensor elements, e.g., amorphous silicon-based photodiodes, arranged in rows and columns. An intermediate imaging plate surface 35 is comprised of imaging plate surface 34 between contact pads 32 and imager array 30.

In an alternate embodiment of the present invention, imager array 30 further comprises a passivation layer. Lamination layer 22 is disposed in intimate contact with passivation layer (not shown in FIG. 1). The passivation layer is typically, by way of example and not limitation, either silicon nitride or silicon oxide.

In an alternate embodiment of the present invention, light imager 24 is formed on a silicon substrate. Particular examples of the silicon substrate light imager include a complementary metal oxide semiconductor (CMOS) camera or a charge coupled device (CCD) camera.

In one embodiment of the present invention, scintillator 26 comprises a plate (having, by way of example and not limitation, a thickness in the range of between about 500 microns and about 25000 microns) which includes a scintillator first surface 40 of FIG. 1 and a scintillator second surface 42 of FIG. 1. In another embodiment, scintillator 26 comprises a fiber optic type scintillator (FOS) formed from fiber optic glass scintillator columns disposed perpendicular to scintillator first surface 40. The FOS typically further comprises internal absorbers disposed around the fiber optic columns so as to reduce lateral scattering of light within scintillator 26. Alternatively, a continuous sheet of scintillating material of gadolinium oxysulfate comprises scintillator 26. Scintillators comprising a continuous sheet of scintillating material of gadolinium oxysulfate are commercially available from, for example, Collimated Holes, Inc., Campbell, Conn.

Scintillator second surface 42 typically is substantially optically reflective (to reflect photons generated in the scintillator 26 back towards the imager array 30). Scintillator 26 is considered substantially optically reflective when the reflectivity of scintillator second surface 42 is greater than about 90%.

In another embodiment of the present invention, scintillator 26 has a substantially columnar structure.

Lamination layer 22 bonds and optically couples imager array 30 and scintillator first surface 40. Lamination layer 22 typically has a thickness in a range between about 5 microns and about 25 microns. Thinner lamination layers typically have less optical crosstalk. However, it is more difficult to form a thinner lamination layer that is substantially free of void spaces. As used herein, lamination layer compositions refer to the volume between the scintillator first surface 40 and the upper surface of imager array 30 that is filled with the lamination material.

In one embodiment of the present invention lamination layer 22 is considered substantially free from void spaces when lamination layer 22 is comprised of at least about 90% of lamination material (i.e. no more than about 10% voids in lamination layer 22).

In another embodiment of the present invention lamination layer 22 is considered substantially free from void spaces when lamination layer 22 is comprised of at least about 95% of lamination material (i.e. no more than about 5% voids in lamination layer 22).

In another embodiment of the present invention lamination layer 22 is considered substantially free from void spaces when lamination layer 22 is comprised of at least about 99% of lamination material (i.e. no more than about 1% voids in lamination layer 22).

In accordance with one embodiment of the present invention, lamination layer 22 is disposed on imager array 30 and scintillator 26 is disposed on lamination layer 22 so that scintillator 26 is aligned over imager array 30.

Figure 2:
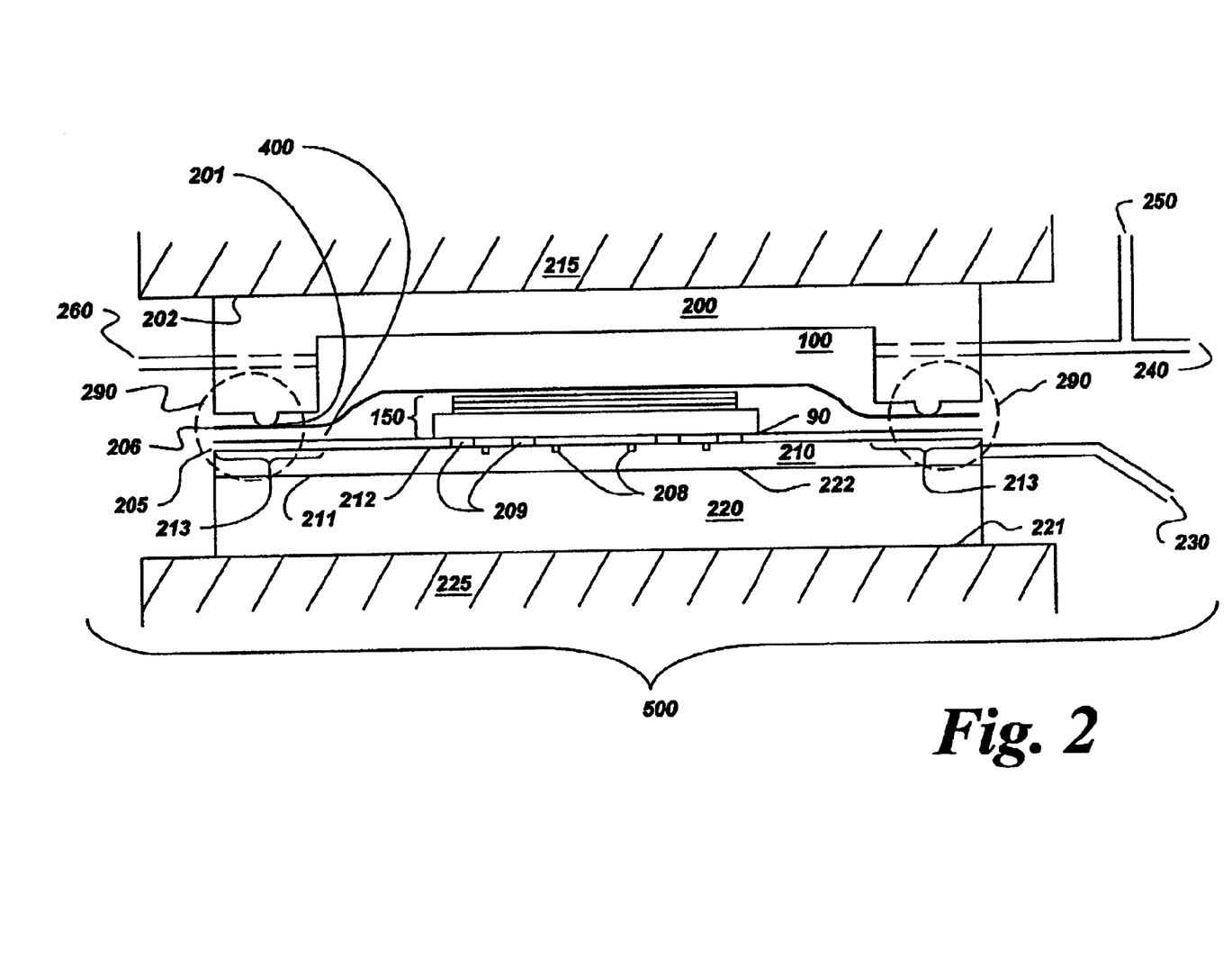
FIG. 2 is a side view of the bonding fixture supporting the subassembly.
Figure 5:
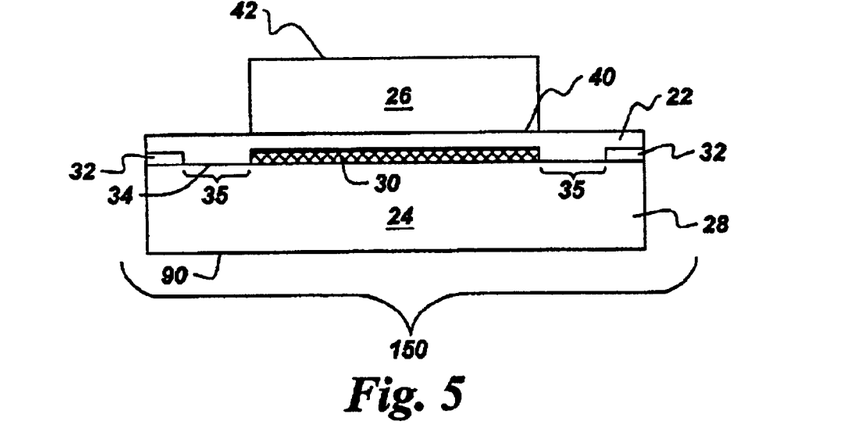
Figure 6:
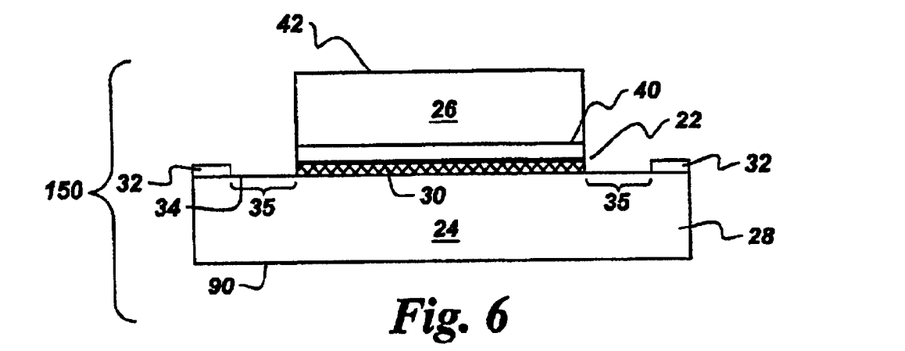
Figure 9:
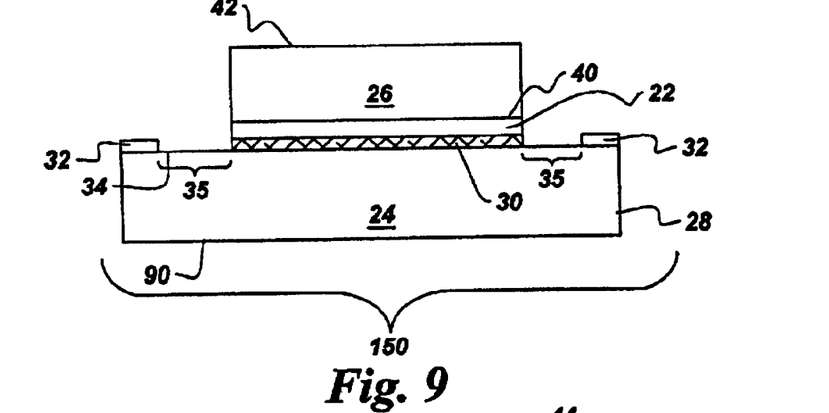

Lamination material in lamination layer 22 comprises an adhesive such that lamination layer 22 bonds to both imager array 30 and scintillator first surface 40 when heated to a specified bonding temperature. A subassembly 150, as depicted in FIGS. 5, 6 and 9, is comprised of scintillator 26, lamination layer 22 and light imager 24. FIG. 2 provides a side view of a bonding fixture 500 supporting subassembly 150.

A cover plate 44 of FIG. 1 is disposed in proximity (about 25 microns to about 50 microns) to scintillator second surface 42, or alternatively in contact with scintillator second surface 42. Cover plate 44 is coupled to intermediate imaging plate surface 35 with an adhesive ring 46 of FIG. 1, typically made of epoxy, to form a hermetic seal 80 of FIG. 1. Hermetic seal 80 is disposed to provide ambient moisture protection for scintillator, lamination layer and imager array. Cover plate 44 comprises, for example, a carbon base composite or aluminum. Adhesive ring 46 commonly comprises a thermoset epoxy that cures at a temperature less than about 100 degrees C. Typically, epoxy used in adhesive ring 46 is opaque.

Excessive void spaces in lamination layer 22 that remain after bonding will adversely affect radiation imaging system performance. The bonding temperature, pressure, and duration requirements are specified in column 4 of the table provided as FIG. 3 to reduce the formation of void spaces during assembly of scintillator 26, lamination layer 22 and imager array 30, so as to provide desired lamination layer characteristics as outlined herein.

For amorphous silicon based light imagers, typical bonding temperatures are limited to about 250 degrees C. to avoid degrading the performance of the amorphous silicon photosensitive elements.

Figure 3:
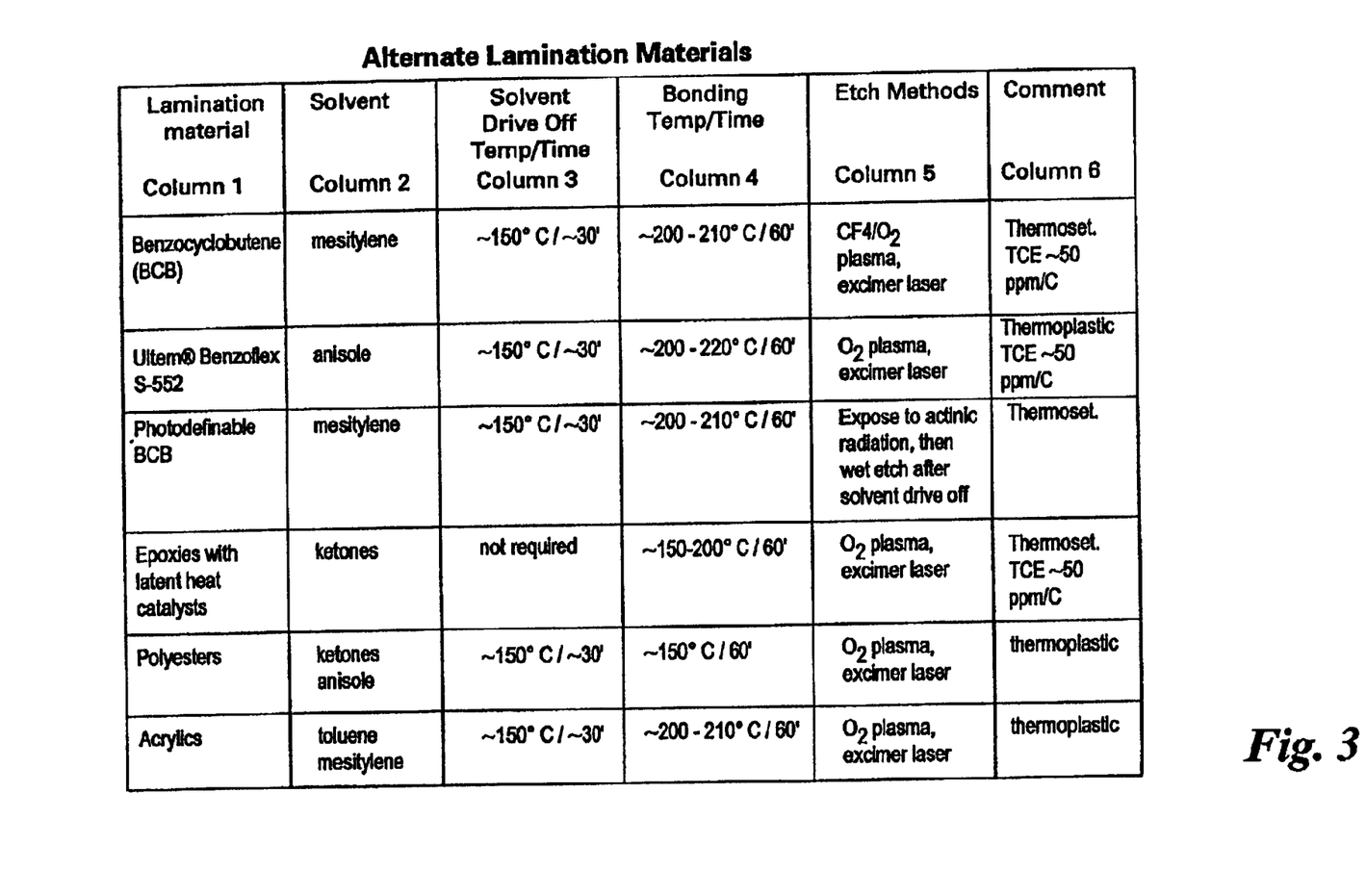
FIG. 3 provides a table illustrating alternative materials for the lamination layer.

Materials suitable for fabricating lamination layer 22 are provided in the first column of the table provided in FIG. 3. The table provides lamination materials selected from the group consisting of Benzocyclobutene (BCB) thermoset polymers, plasticized polyetherimide thermoplastic polymers with a glass transition temperature ($T_g$) of less than about 180 degrees C. (i.e. a blend of a polyetherimide and a pentarythrytol tetrabenzoate), photodefinable BCB thermoset polymers, thermoset polymer epoxies with latent heat catalysts, thermoplastic polyester polymers and thermoplastic acrylic polymers.

In one embodiment of the present invention, and referring specifically to column 1 of the table provided in FIG. 3, lamination layer 22 of FIG. 1 may be fabricated from a thermoset polymer Benzocyclobutene (BCB) with mesitylene as a solvent. Thermoset polymer Benzocyclobutene (BCB) lamination material is then soft baked to drive off the solvent, per the temperature and duration provided in column 3 of the table provided as FIG. 3. When utilizing thermoset polymer Benzocyclobutene (BCB) with mesitylene as a solvent as the lamination material, the solvent drive off temperature and duration is approximately 150 degrees C. and approximately 30 minutes, respectively.

In another embodiment of the present invention, lamination layer 22 may be a film fabricated from a plasticized polyetherimide with a $T_g$ of less than about 180 degrees C. A suitable example of a plasticized polyetherimide with a $T_g$ of less than about 180 degrees C. is a blend of Ultem 1000® with Benzoflex S-552 (Ultem®/Benzoflex S-552).

Ultem®/Benzoflex S-552 is a plasticized polyetherimide blend containing a range of between about 5% to about 40% by weight of pentarythrytol tetrabenzoate (also known as Benzoflex S-552) with a range of between about 60% and about 95% by weight polyetherimide (Ultem® 1000). The Benzoflex S-552 (sold by Velsicol Corporation, Rosemont, Ill.) is a plasticizer for Ultem® 1000. Ultem® 1000 is commercially available from General Electric Company, Pittsfield, Mass. Blending the Benzoflex S-552 into the Ultem® 1000 lowers the $T_g$ of Ultem® 1000 from about 220 degrees C. to about 180 degrees C. for Ultem® Benzoflex S-552. Additionally, the melt viscosity and bonding temperature is lowered from about 300 degrees C. for Ultem® 1000 to about 250 degrees C. for Ultem® Benzoflex S-552. The Ultem® Benzoflex S-552 blend was used to meet the bonding temperature limitation of about 250 degrees C. to avoid degrading the performance of the amorphous silicon photosensitive elements.

Moreover, in another embodiment, lamination material is applied as a liquid solution, for example by coating. One such liquid solution is Ultem®/Benzoflex S-552 of about 15% to about 20% by weight in anisole (FIG. 3). After coating, the solvent is driven off by soft baking for about 30 minutes at about 150° C. as noted in column 3 of the table provided in FIG. 3.

Another embodiment of the present invention is to use a lamination material that can be photodefined. One such material is a photodefinable BCB thermoplastic polymer as depicted in the table provided as FIG. 3. In this case, lamination material is imaged to remove it selectively, which eliminates the need for the plasma etching or excimer laser ablation steps.

Another embodiment of the present invention utilizes a thermoset polymer epoxy as lamination material. Thermoset polymer epoxy may be a blend of siloxane polyimide (SPI) and a cycloaliphatic epoxy of about equal parts, and about 1% of an onium salt catalyst to form a thermoset adhesive blend. Thermoset polymer epoxy is applied onto the light imager 24 of FIG. 1 formed on the silicon substrate and the thermoset reaction is catalyzed by the onium salt catalyst at a range of between about 150° C. and about 200° C. This process is particularly useful when assembling amorphous silicon based light imagers, since the low bonding temperature reduces mechanical stress in radiation imaging system 20 due to thermal coefficient of expansion mismatch between scintillator 26 and light imager 24. In addition, soft baking thermoset polymer epoxy is not required prior to bonding.

Another embodiment of the present invention is to use a polyester thermoplastic polymer as a lamination material as depicted in the table provided as FIG. 3. Portions of polyester thermoplastic polymer lamination material that extend beyond scintillator 26 of FIG. 5 are then removed utilizing an excimer laser or oxygen ($O_2$) plasma.

Another embodiment of the present invention is to use an acrylic thermoplastic polymer as a lamination material as depicted in the table provided as FIG. 3. Portions of acrylic thermoplastic polymer lamination material that extend beyond scintillator 26 of FIG. 5 are then removed utilizing an excimer laser or $O_2$ plasma.

A second column in the table provided as FIG. 3 depicts the solvents to be utilized with respective lamination materials listed in the first column. A third column in the table provided as FIG. 3 provides the solvent drive off temperatures and times. A fourth column in the table provided as FIG. 3 provides the bonding temperatures and times. A fifth column in the table provided as FIG. 3 identifies potential etching methods. A sixth column in the table provided as FIG. 3 provides general comments.

The sixth column of the table provides general comments for the respective lamination material. For example, BCB is a thermoset polymer material, which has a thermal coefficient of expansion (TCE) of approximately 50 parts per million per Celsius degree (ppm/C.). A lamination material with a low TCE is desirable because light imager 24 of FIG. 1 and scintillator 26 typically have a TCE below 10-ppm/ degree C. By more closely coupling TCE of scintillator material and TCE of lamination material, the stress in the final assembled radiation imaging system 20 is reduced.

In another embodiment of the present invention, lamination layer 22 further comprises an optical absorbing material for reducing scintillator light intensity and any lateral spread of scintillator light through lamination layer 22. The addition of this optical absorbing material reduces the likelihood of oversaturation of the photosensor array. In this embodiment, lamination layer 22 typically has a thickness in a range between about 5 microns and about 12.5 microns. The optical absorbing material typically reduces light passing from scintillator 26 by between about 10% and about 90%. The optical absorbing material typically comprises an anthraquinone-based dye such as diaminoanthraquinone (DAA) or 1-methylamino-4-dihydroxyanthraquinone (DHA). The maximum absorption of the optical absorbing material is selected to reasonably match a peak sensitivity of the photosensor elements of imager array 30 multiplied by the output of scintillator 26, e.g., approximately 0.6 microns wavelength for amorphous silicon photodiodes. For example, if lamination layer 22 is about 12.5 microns thick, about 0.5 weight percent to about 5 weight percent of dye in lamination material in lamination layer 22 causes an optical absorption change from about 10% to about 90%.

In addition, while lamination layer 22 is described above in connection with optical absorbing anthraquinone based dye, lamination layer 22 may include other optical absorbing materials such as sub-micron carbon powders and azo-based dyes. Furthermore, in some embodiments, lamination layer 22 does not include an optical absorbing material.

A bonding fixture 500 of FIG. 2 is designed to facilitate bonding of subassembly 150 of FIG. 5. Bonding fixture 500 of FIG. 2 has a heater 220 of FIG. 2 disposed on a bottom foundation 225 of FIG. 2, so that a heater first side 221 of FIG. 2 contacts bottom foundation 225. A vacuum tray 210 of FIG. 2 is disposed on heater 220, so that a vacuum tray first side 211 of FIG. 2 is disposed on a heater second side 222 of FIG. 2. Vacuum tray 210 is configured with at least one bottom vacuum coupling 230 of FIG. 2. Vacuum tray 210 is configured to have a plurality of vacuum tray vent slits 208 of FIG. 2 machined into a vacuum tray second side 212 of FIG. 2. Vacuum tray 210 is configured with internal passages that connect bottom vacuum coupling 230 with vacuum tray vent slits 208. A gasket 205 of FIG. 2 about 50 microns (2 mils) thick is placed on vacuum tray second side 212. Gasket 205 covers vacuum tray second surface 212. Gasket 205 has a plurality of gasket vent slits 209 of FIG. 2 that are in communication with vacuum tray vent slits 208 that are machined in vacuum tray 210. A fixture cover 200 of FIG. 2 is configured to have two couplings. The first coupling is a vent coupling 260 of FIG. 2 and a second coupling is used jointly as a coupling for a top vacuum coupling 250 of FIG. 2 and an inert gas coupling 240 of FIG. 2. The inert gas typically utilized is either nitrogen or argon.

A polyimide film is utilized as the material for both a bladder 206 of FIG. 2 and gasket 205 to assist in reducing leakage through a periphery seal 290 of FIG. 2 when pressure is established in a bottom chamber 400 of FIG. 2 of bonding fixture 500. Polyimide film used in gasket 205 also assists in preventing subassembly 150 from adhering to vacuum tray second side 212 during bonding. After subassembly 150 of FIG. 5 has bonded and cooled to a safe handling temperature and subsequently removed from vacuum tray 210 of FIG. 2, gasket 205 is removed from subassembly 150.

In one embodiment of the present invention, a Kapton® polyimide film (a registered trademark of E.I. du Pont de Nemours and Company 1007 Market Street, Wilmington, Del. 19898) is utilized as material for both bladder 206 and gasket 205.

In one embodiment of the present invention, radiation imaging system 20 of FIG. 1 is fabricated comprising the steps of disposing lamination layer 22 of FIG. 5 between light imager 24 and scintillator 26 to form subassembly 150. Light imager 24 comprises an imager array 30, an imaging plate surface 34 and contact pads 32. In the next step, subassembly 150 is then subjected to a vacuum, which is followed by heating subassembly 150 to a bonding temperature. Subsequently, a bonding force is exerted on subassembly 150. The vacuum, bonding temperature and bonding force are maintained until light imager 24 is bonded to scintillator 26 and lamination layer 22 is comprised of lamination material that is substantially void free.

FIGS. 4, 5, 6 and 7 illustrate a detailed sequence of steps for forming radiation imaging system 20 of FIG. 1. In one embodiment of the present invention, lamination layer 22 is formed from a liquid solution such as Ultem®/Benzoflex S-552 of about 15% to 20% by weight in anisole.

Figure 4:
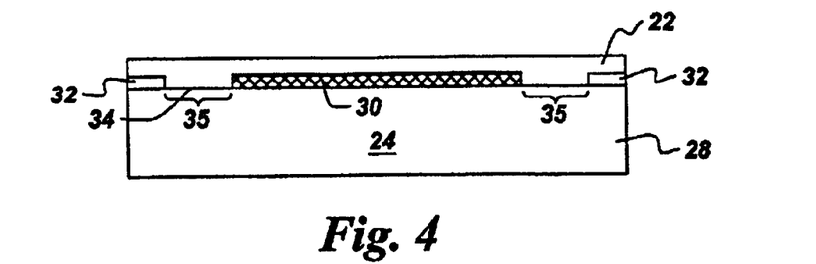
FIGS. 4, 5, 6 and 7 illustrate a sequence of steps for fabricating the radiation imaging system shown in FIG. 1 in accordance with one embodiment of the present invention.

Referring to FIG. 4, lamination layer 22 is disposed on light imager 24 including imager array 30, intermediate imaging plate surface 35 of imaging plate surface 34 and contact pads 32. Intermediate imaging plate surface 35 is comprised of imaging plate surface 34 between imager array 30 and contact pads 32. Lamination layer 22 is commonly disposed to light imager 24 by the process of, for example, spinning, spraying, or meniscus coating. Multiple coats are disposed, if needed, to achieve the desired thickness of lamination layer 22.

Light imager 24 and lamination layer 22 are then soft baked as required, to drive off excess solvent from lamination layer 22. The soft baking is performed per the solvent drive off temperature and time specified in column 3 for the respective lamination material of column 1 of the table provided in FIG. 3. This soft baking process step is accomplished prior to disposing scintillator 26 onto lamination layer 22.

Referring to FIG. 5, scintillator 26 is disposed on lamination layer 22, so that scintillator first surface 40 is disposed on lamination layer 22. Scintillator 26 is also positioned to cover imager array 30 to produce subassembly 150 as shown in FIG. 5.

Referring to FIG. 6, in another embodiment of the present invention, subassembly 150 is produced by removing lamination layer 22 from intermediate imaging plate surface 35 and contact pads 32. For example, plasma etching in oxygen (or alternatively, other appropriate gasses) can accomplish the lamination layer 22 removal from intermediate imaging plate surface 35 and contact pads 32. Alternatively lamination layer 22 is removed from intermediate imaging plate surface 35 and contact pads 32 by excimer laser ablation using scintillator 26 as the etching mask. Specific etching methods for each respective lamination material are depicted in column 5 of the table provided as FIG. 3.

In one embodiment of the present invention, the removal of lamination layer 22 of FIG. 5 from intermediate imaging plate surface 35 and contact pads 32 can be accomplished prior to bonding subassembly 150.

In another embodiment of the present invention, the removal of lamination layer 22 from intermediate imaging plate surface 35 and contact pads 32 can be accomplished after bonding subassembly 150.

Gasket vent slits 209 of FIG. 2 of gasket 205 are disposed on vacuum tray 210 so as to communicate with vacuum tray vent slits 208.

According to one embodiment of the present invention, a first side 90 of subassembly 150 is disposed on gasket 205 of FIG. 2, so as to cover gasket vent slits 209 and vacuum tray vent slits 208.

According to another embodiment of the present invention, a first side 90 of FIG. 2 of subassembly 150 is disposed on gasket 205, so that subassembly 150 covers gasket vent slits 209 and vacuum tray vent slits 208.

A bladder 206 about 50 microns (2 mils) thick is disposed so as to cover subassembly 150 as shown in FIG. 2. Bladder 206 also covers gasket 205 at a vacuum tray periphery 213 to form bottom chamber 400 between bladder 206 and vacuum tray 210. Fixture cover 200 is positioned such that a fixture cover first side 201 contacts bladder 206 at vacuum tray periphery 213 to form a top chamber 100 between fixture cover first side 201 and bladder 206.

A top foundation 215 is placed in contact with a fixture cover second side 202. Fixture cover first side 201, bladder 206, gasket 205 and vacuum tray second side 212 comprise periphery seal 290.

A bottom chamber absolute pressure of no more than about 13 kPa (100 millimeters (mm) of mercury (Hg)) is then established and maintained in bottom chamber 400 through bottom vacuum coupling 230. Heater 220 heats subassembly 150 to a bonding temperature after bottom chamber absolute pressure is established. Heat from heater 220 is transferred to subassembly 150 through vacuum tray 210 and gasket 205.

When subassembly 150 reaches the bonding temperature per column 4 for the respective lamination material of column 1 of the table provided in FIG. 3, inert gas is admitted through inert gas coupling 240 of FIG. 2 to pressurize and maintain an absolute pressure range of between about 170 kPa (10 psig) and about 377 kPa (40 psig) in top chamber 100. The pressure in top chamber 100 provides the bonding force. The bottom chamber pressure conditions, top chamber pressure conditions (bonding force) and bonding temperature conditions are then maintained until light imager 24 of FIG. 5 is bonded to scintillator 26 and lamination layer 22 is comprised of lamination material that is substantially free of void spaces. Bonding duration is specified for each lamination material in column 4 of the table provided in FIG. 3.

The pressure in top chamber 100 of FIG. 2 is restored to about atmospheric conditions and the pressure in bottom chamber 400 is restored to about atmospheric pressure.

In one embodiment of the present invention, after bonding subassembly 150 of FIG. 5, subassembly 150, gasket 205 of FIG. 2 (attached to first side 90 of FIG. 5 of light imager 24), fixture cover 200 of FIG. 2 and bladder 206, are subsequently cooled to a safe handling temperature of between about 0 degree C. and about 60 degrees C. Fixture cover 200 and bladder 206 are removed. Subassembly 150 of FIG. 5 and gasket 205 of FIG. 2 are then removed from vacuum tray 210. Gasket 205 is then removed from first side 90 of FIG. 5 of light imager 24.

In another embodiment of the present invention, after bonding subassembly 150 of FIG. 6, subassembly 150, gasket 205 of FIG. 2 (attached to first side 90 of FIG. 6 of light imager 24), fixture cover 200 of FIG. 2 and bladder 206, are subsequently cooled to a safe handling temperature of between about 0 degree C. and about 60 degrees C. Fixture cover 200 and bladder 206 are removed. Subassembly 150 of FIG. 5 and gasket 205 of FIG. 2 are then removed from vacuum tray 210. Gasket 205 is then removed from first side 90 of FIG. 6 of light imager 24.

In one embodiment of the present invention, subassembly 150 as shown in FIG. 5 depicts lamination layer 22 also covering intermediate imaging plate surface 35 and contact pads 32. Lamination layer 22 covering intermediate imaging plate surface 35 and contact pads 32 is removed by plasma etching in oxygen (or alternatively, other appropriate gasses). Alternatively lamination layer 22 covering intermediate imaging plate surface 35 and contact pads 32 is removed by excimer laser ablation using scintillator 26 as the etching mask. Specific etching methods for each respective lamination material are depicted in column 5 of the table provided as FIG. 3. After removing lamination layer 22 covering intermediate imaging plate surface 35 and contact pads 32, FIG. 6 depicts resulting subassembly 150.

Figure 7:
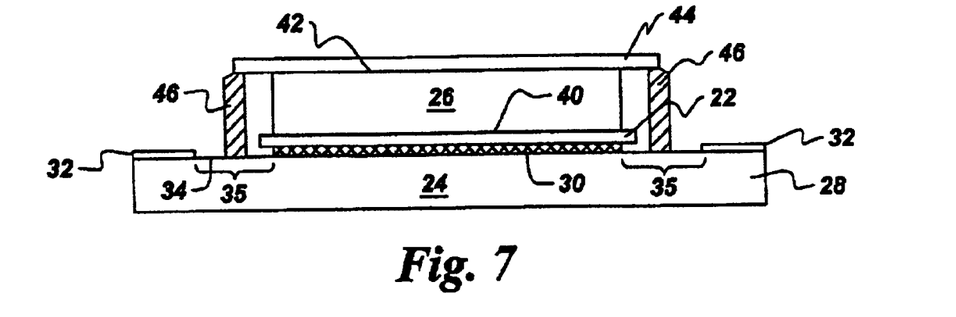

Referring to FIG. 7, typically a bead of epoxy forms adhesive ring 46 disposed on intermediate imaging plate surface 35. Cover plate 44 is coupled to intermediate imaging plate surface 35 with adhesive ring 46, such that cover plate 44 is in proximity (about 25 microns to about 50 microns) to, or alternatively in contact with, scintillator second surface 42.

Hermetic seal 80 of FIG. 1 provides ambient moisture protection for scintillator 26, lamination layer 22, and imager array 30.

Figure 8:
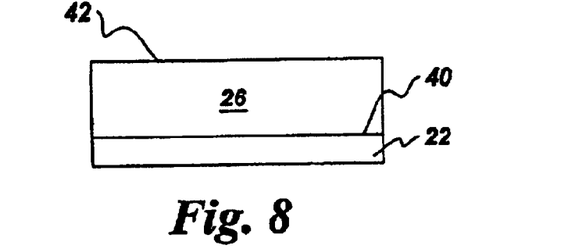
FIGS. 8, 9 and 10 illustrate a sequence of steps for fabricating the radiation imaging system shown in FIG. 1 in accordance with another embodiment of the present invention.
Figure 10:
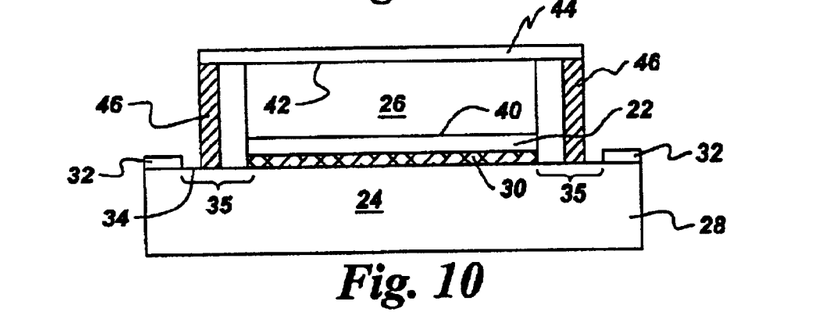

FIGS. 8, 9 and 10 illustrate a sequence of steps in accordance with another embodiment for forming radiation imaging system 20 of FIG. 1. In one embodiment of the present invention, lamination layer 22 of FIG. 8 is formed from a liquid solution such as Ultem®/Benzoflex S-552 of about 15% to 20% by weight in anisole.

Referring to FIG. 8, lamination layer 22 is disposed, e.g., spun, sprayed, or meniscus coated, onto scintillator 26 such that lamination layer 22 covers scintillator first surface 40.

Scintillator 26 and lamination layer 22 are then soft baked, as necessary, to drive off excess solvent from lamination layer 22. Soft baking is performed per the solvent drive off temperature and time specified in column 3 for the respective lamination material of column 1 of the table provided in FIG. 3. This soft baking process step is accomplished prior to disposing scintillator 26 and lamination layer 22 on light imager 24.

Referring to FIG. 9, lamination layer 22 is disposed on light imager 24 such that scintillator 26 covers imager array 30. Subassembly 150 comprises scintillator 26, lamination layer 22 and light imager 24, as shown in FIG. 9.

The bonding of subassembly 150 and removal of gasket 205 from first side 90 of light imager 24 is performed as described above.

This embodiment of the present invention does not require removal of lamination layer 22 covering intermediate imaging plate surface 35 and contact pads 32. This allows coupling cover plate 44 to intermediate imaging plate surface 35 without having to perform the step of removing lamination layer 22 from intermediate imaging plate surface 35 and contact pads 32.

Referring to FIG. 10, typically a bead of epoxy forms adhesive ring 46 disposed on intermediate imaging plate surface 35. Cover plate 44 is coupled to intermediate imaging plate surface 35 with adhesive ring 46, such that cover plate 44 is in proximity (about 25 microns to about 50 microns) to, or alternatively in contact with, scintillator second surface 42.

Hermetic seal 80 of FIG. 1 provides ambient moisture protection for scintillator 26, lamination layer 22, and imager array 30.

Figure 11:
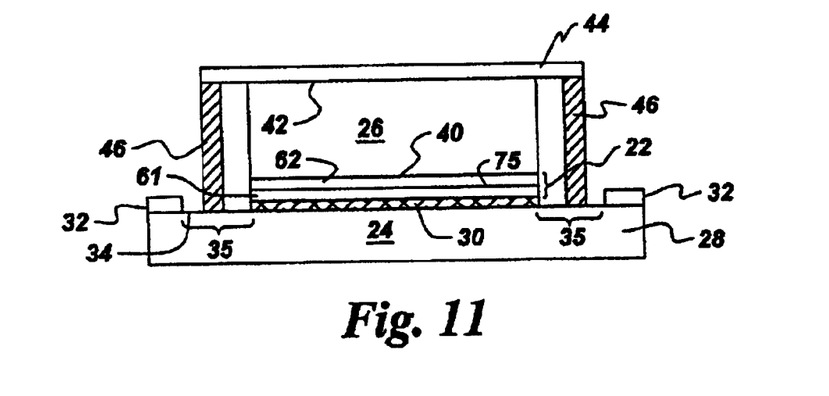
FIG. 11 provides a side view of a radiation imaging system where the lamination layer comprises a first lamination layer portion and a second lamination layer portion, in accordance with still another embodiment of the present invention.

In accordance with yet another embodiment, lamination layer 22 includes a first lamination layer portion 61 of FIG. 11 and a second lamination layer portion 62 of FIG. 11. Second lamination layer portion 62 is disposed, e.g., spin coated or meniscus coated, on scintillator 26, such that second lamination layer portion 62 is approximately 5 microns thick and covers scintillator first surface 40. First lamination layer portion 61 is disposed, e.g., spin, spray, or meniscus coated, on imager array 30 of light imager 24 so that first lamination layer portion 61 is approximately 5 microns thick. Both scintillator 26, with a second lamination layer portion 62, and light imager 24, with a first lamination layer portion 61, are then soft baked, as required, to drive off excess solvent per the solvent drive off temperature and time provided in column 3 of the table provided in FIG. 3. Second lamination layer portion 62 of FIG. 11 is then disposed on first lamination layer portion 61 at a first interface 75 of FIG. 1 to form lamination layer 22, so that scintillator 26 covers imager array 30. Lamination layer 22 is disposed between scintillator first surface 40 and imager array 30. Scintillator 26, lamination layer 22 and light imager 24 comprise subassembly 150.

In one embodiment of the present invention, first lamination layer portion 61 is disposed as described above on light imager 24 such that first lamination layer portion 61 is constrained to be disposed only on imager array 30.

Referring to FIG. 11, typically a bead of epoxy forms adhesive ring 46 disposed on intermediate imaging plate surface 35. Cover plate 44 is coupled to intermediate imaging plate surface 35 with adhesive ring 46, such that cover plate 44 is in proximity (about 25 microns to about 50 microns) to, or alternatively in contact with, scintillator second surface 42.

Hermetic seal 80 of FIG. 1 provides ambient moisture protection for scintillator 26, lamination layer 22, and imager array 30.

In another embodiment of the present invention, top chamber 100 of FIG. 2 can be under vacuum through top vacuum coupling 250 while bottom chamber 400 is under vacuum, prior to heater 220 heating subassembly 150 to bonding temperature. An absolute pressure of no more than about 13 kPa (100 mm Hg) is then established in both top chamber 100 and bottom chamber 400 through top and bottom vacuum couplings 250 and 230, respectively. When the vacuum reaches an absolute pressure of no more than about 13 kPa (100 mm Hg) in bottom chamber 400, heater 220 heats subassembly 150. When subassembly 150 reaches bonding temperature, top chamber 100 is pressurized through inert gas coupling 240 to an absolute pressure range of between about 170 kPa (10 psig) and about 377 kPa (40 psig). The bonding pressures in top chamber 100 and bottom chamber 400 and bonding temperature for subassembly 150 are maintained for the duration specified in column 4 of the table provided as FIG. 3.

The above described methods and materials for fabricating radiation imaging system 20 of FIG. 1 are believed to provide improved optical quality for large imagers, i.e., larger than approximately 100 cm$^2$. One area of optical quality improvement is the improved optical coupling between scintillator 26 and light array 30. Further, the presence of optical absorbing material in lamination layer 22 reduces the signal from scintillator 26 below saturation and improves the signal-to-noise ratio. In addition, lamination layer 22 reduces lateral light spread, which further improves image quality.

Improved large imager optical quality is determined using two quantitative measurements. The first quantitative measurement determines the modulation transfer function (MTF), which represents a measure of the light spread. The second quantitative measurement is the defective quantum efficiency, which includes both the MTF and the noise terms; therefore, the defective quantum efficiency is a reflection of the signal-to-noise of the image detectability. It is believed that radiation imaging system 20 reduces the likelihood of system oversaturation without reducing signal-to-noise ratio and without requiring, for example, that scintillator 26 have lower scintillation efficiency.

Lamination layer 22 of the present invention is readily adapted for used with both low-energy and high-energy radiation imaging systems. Radiation imaging system 20 of the present invention is also suitable for use in either a high-energy X-ray radiographic system or a computed tomography imaging system applications.

Another benefit of the present invention is increased mechanical robustness, as the present invention requires no external clamping of scintillator 26 and imager array 30 during operation.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A radiation imaging system comprising:
    a scintillator;
    an imager array; and
    a lamination layer disposed between said scintillator and said imager array to provide bonding and optical coupling, said lamination layer comprising a lamination material, wherein said lamination material is selected from a group consisting of plasticized polyetherimide thermoplastic polymers having a glass transition temperature ($T_g$) of less than about 180 degrees C. (i.e. a blend of said polyetherimide and a pentarythrytol terrabenzoate), thermoset polymer epoxies with latent heat catalysts, thermoplastic polyester polymers and thermoplastic acrylic polymers, and
wherein said plasticized polyetherimide thermoplastic polymers further comprise mixtures of polyetherimide and pentarythrytol tetrabenzoate, and mixtures having a range of between about 60% and about 95% by weight of said polyetherimide and a range of about 5% to about 40% by weight of said pentarythrytol tetrabenzoate.

2. The radiation imaging system in accordance with claim 1 wherein:
    said lamination layer further comprises at least about 90% of said lamination material.

3. The radiation imaging system in accordance with claim 1 further comprising a hermetic seal disposed to provide ambient moisture protection for said scintillator, said lamination layer and said imager array.

4. The radiation imaging system in accordance with claim 1 wherein said scintillator has a scintillator second surface that is substantially optically reflective.

5. The radiation imaging system in accordance with claim 1 wherein said lamination layer has a thickness in a range between about 5 microns and about 25 microns.

6. A radiation imaging system comprising:
    a scintillator;
    an imager array; and
    a lamination layer disposed between said scintillator and said imager array to provide bonding and optical coupling, wherein said lamination layer comprises an optical absorbing material which comprises an anthraquinone-based dye selected from a group consisting of diaminoanthraquinone (DAA) and 1-methylamino4-dihydroxyanthraquinone (DHA).

7. The radiation imaging system in accordance with claim 6 wherein said lamination layer has a thickness in a range between about 5 microns and about 12.5 microns.

8. The radiation imaging system in accordance with claim 6 wherein said lamination layer comprises between about 0.5 and about 5 weight percent of said anthraquinone-based dye in said lamination material.

9. A radiation imaging system comprising:

a scintillator;

an imager array; and a lamination layer disposed between said scintillator and said imager array to provide bonding and optical coupling, wherein said lamination layer comprises an optical absorbing material that is selected from a group consisting of sub-micron carbon powders and azo-based dyes.

10. The radiation imaging system in accordance with claim 9 wherein:

said lamination layer further comprises at least about 95% of said lamination material.

11. The radiation imaging system in accordance with claim 10 wherein:

said lamination layer further comprises at least about 99% of said lamination material.

12. The radiation imaging system in accordance with claim 9 wherein said scintillator has a thickness in a range between about 500 microns and about 25000 microns.

13. The radiation imaging system in accordance with claim 9 wherein said scintillator has a substantially columnar structure.

14. The radiation imaging system in accordance with claim 9 wherein said lamination layer has a thickness in a range between about 5 microns and about 12.5 microns.

15. The radiation imaging system in accordance with claim 9 wherein said scintillator is a fiber optic type scintillator (FOS).

16. A radiation imaging system comprising:

a scintillator;

an imager array; and a lamination layer disposed between said scintllator and said imager array to provide bonding and optical coupling, said lamination layer comprising at least about 90% of a lamination material, wherein said lamination layer has a thickness in a range between about 5 microns and about 25 microns, wherein said lamination material is selected from a group consisting of plasticized polyetherimide thermoplastic polymers having a glass transition temperature $T_g$ of less than about 180 degrees C. (i.e. a blend of said polyetherimide and a pentarythryol tetrabenzoate), thermoset polymer epoxies with latent heat catalysts, thermoplastic polyester polymers and thermoplastic acrylic polymers, and wherein said plasticized polyetherimide thermoplastic polymers further comprise mixtures of polyetherimide and pentarythrytol tetrabenzoate, said mixtures having a range of between about 60% and about 95% by weight of said polyetherimide and a range of between about 5% to about 40% by weight of said pentarythrytol tetrabenzoate.

17. The radiation imaging system in accordance with claim 16, further comprising a hermetic seal disposed to provide ambient moisture protection for said scintillator, said lamination layer and said imager array.

* * * * *